(12) United States Patent
Woodral

(10) Patent No.: US 7,461,195 B1
(45) Date of Patent: Dec. 2, 2008

(54) METHOD AND SYSTEM FOR DYNAMICALLY ADJUSTING DATA TRANSFER RATES IN PCI-EXPRESS DEVICES

(75) Inventor: David E Woodral, Walnut, CA (US)

(73) Assignee: QLogic, Corporation, Aliso Viejo, CA (US)

( * ) Notice: Subject to any disclaimer, the term of this patent is extended or adjusted under 35 U.S.C. 154(b) by 32 days.

(21) Appl. No.: 11/378,838

(22) Filed: Mar. 17, 2006

(51) Int. Cl.
*G06F 13/00* (2006.01)
(52) U.S. Cl. .................. 710/313; 710/104; 710/316
(58) Field of Classification Search ............... 710/107, 710/313, 104, 316
See application file for complete search history.

(56) References Cited

U.S. PATENT DOCUMENTS

| | | | |
|---|---|---|---|
| 4,268,906 A | 5/1981 | Bourke et al. |
| 4,333,143 A | 6/1982 | Calder |
| 4,449,182 A | 5/1984 | Rubinson et al. |
| 4,549,263 A | 10/1985 | Calder |
| 4,777,595 A | 10/1988 | Strecker et al. |
| 4,783,730 A | 11/1988 | Fischer et al. |
| 4,783,739 A | 11/1988 | Calder |
| 4,803,622 A | 2/1989 | Bain, Jr. et al. |
| 5,129,064 A | 7/1992 | Fogg, Jr. et al. |
| 5,212,795 A | 5/1993 | Hendry |
| 5,249,279 A | 9/1993 | Schmenk et al. |
| 5,276,807 A | 1/1994 | Kodama et al. |
| 5,280,587 A | 1/1994 | Shimodaira et al. |
| 5,321,816 A | 6/1994 | Rogan et al. |
| 5,347,638 A | 9/1994 | Desai et al. |
| 5,371,861 A | 12/1994 | Keener et al. |
| 5,448,702 A | 9/1995 | Garcia, Jr. et al. |
| 5,568,614 A | 10/1996 | Mendelson et al. |
| 5,613,162 A | 3/1997 | Kabenjian et al. |
| 5,647,057 A | 7/1997 | Roden et al. |
| 5,671,365 A | 9/1997 | Binford et al. |

(Continued)

FOREIGN PATENT DOCUMENTS

EP 0738978 10/1996

(Continued)

OTHER PUBLICATIONS

Budruk, Ravi; Anderson, Don; and Shanley, Tom; PCI Express System Architecture; MindShare Inc.; pp. 499-518; 2004.*

(Continued)

*Primary Examiner*—Glenn A Auve
(74) *Attorney, Agent, or Firm*—Klein, O'Neill & Singh, LLP

(57) ABSTRACT

Method and system for configuring a PCI-Express device is provided. The method includes determining if a number of lanes supported by the PCI-Express device is equal to or greater than a number X, after a receiver is detected by the PCI-Express device; and setting a transfer rate depending on the number X. The PCI-Express Device includes PCI-Express core logic that receives information from a Physical Coding Sub-layer indicating if a number of lanes supported by the PCI-Express device is equal to or greater than a number X, after a receiver is detected; and a transfer rate is set depending on the number X. The value of X depends on the PCI-Express device's throughput capability and a data transfer rate.

16 Claims, 7 Drawing Sheets

U.S. PATENT DOCUMENTS

| | | | |
|---|---|---|---|
| 5,740,467 A | 4/1998 | Chmielecki et al. |
| 5,758,187 A | 5/1998 | Young |
| 5,761,427 A | 6/1998 | Shah et al. |
| 5,828,903 A | 10/1998 | Sethuram et al. |
| 5,875,343 A | 2/1999 | Binford et al. |
| 5,881,296 A | 3/1999 | Williams et al. |
| 5,892,969 A | 4/1999 | Young |
| 5,905,905 A | 5/1999 | Dailey et al. |
| 5,917,723 A | 6/1999 | Binford |
| 5,968,143 A | 10/1999 | Chisholm et al. |
| 5,983,292 A | 11/1999 | Nordstorm et al. |
| 6,006,340 A | 12/1999 | O'Connell |
| 6,049,802 A | 4/2000 | Waggener, Jr. et al. |
| 6,055,603 A | 4/2000 | Ofer et al. |
| 6,078,970 A | 6/2000 | Nordstorm |
| 6,085,277 A | 7/2000 | Nordstorm et al. |
| 6,115,761 A | 9/2000 | Daniel et al. |
| 6,138,176 A | 10/2000 | McDonald et al. |
| 6,185,620 B1 | 2/2001 | Weber et al. |
| 6,233,244 B1 | 5/2001 | Runaldue et al. |
| 6,269,413 B1 | 7/2001 | Sherlock |
| 6,343,324 B1 | 1/2002 | Hubis et al. |
| 6,434,630 B1 | 8/2002 | Micalizzi, Jr. et al. |
| 6,457,090 B1 | 9/2002 | Young |
| 6,463,032 B1 | 10/2002 | Lau et al. |
| 6,502,189 B1 | 12/2002 | Westby |
| 6,504,846 B1 | 1/2003 | Yu et al. |
| 6,546,010 B1 | 4/2003 | Merchant et al. |
| 6,564,271 B2 | 5/2003 | Micalizzi et al. |
| 6,721,799 B1 | 4/2004 | Slivkoff |
| 6,775,693 B1 | 8/2004 | Adams |
| 6,810,440 B2 | 10/2004 | Micalizzi, Jr. et al. |
| 6,810,442 B1 | 10/2004 | Lin |
| 7,231,480 B2 | 6/2007 | Woodral |
| 2003/0056000 A1 | 3/2003 | Mullendore et al. |
| 2003/0126320 A1 | 7/2003 | Liu et al. |
| 2003/0126322 A1 | 7/2003 | Micalizzi, Jr. et al. |
| 2003/0236953 A1 | 12/2003 | Grieff et al. |
| 2005/0093575 A1 | 5/2005 | Schoenborn et al. |
| 2005/0104623 A1 | 5/2005 | Guo et al. |
| 2006/0129733 A1 | 6/2006 | Sobelman |
| 2006/0253619 A1* | 11/2006 | Torudbakken et al. ......... 710/31 |
| 2007/0067548 A1* | 3/2007 | Juenger ...................... 710/315 |

FOREIGN PATENT DOCUMENTS

| | | |
|---|---|---|
| EP | 1059588 | 12/2000 |
| WO | WO 95/06286 | 3/1995 |
| WO | WO 0058843 | 10/2000 |

OTHER PUBLICATIONS

"PCI Express Base Specification Revision 1.0", *PCI-SIG*, (Apr. 29, 2002), 183, 184, 199-201.

"PCI Express Base Specification Revision 1.0a", *PCI-SIG*, (Apr. 15, 2003), 171, 172, 204 & 205.

\* cited by examiner

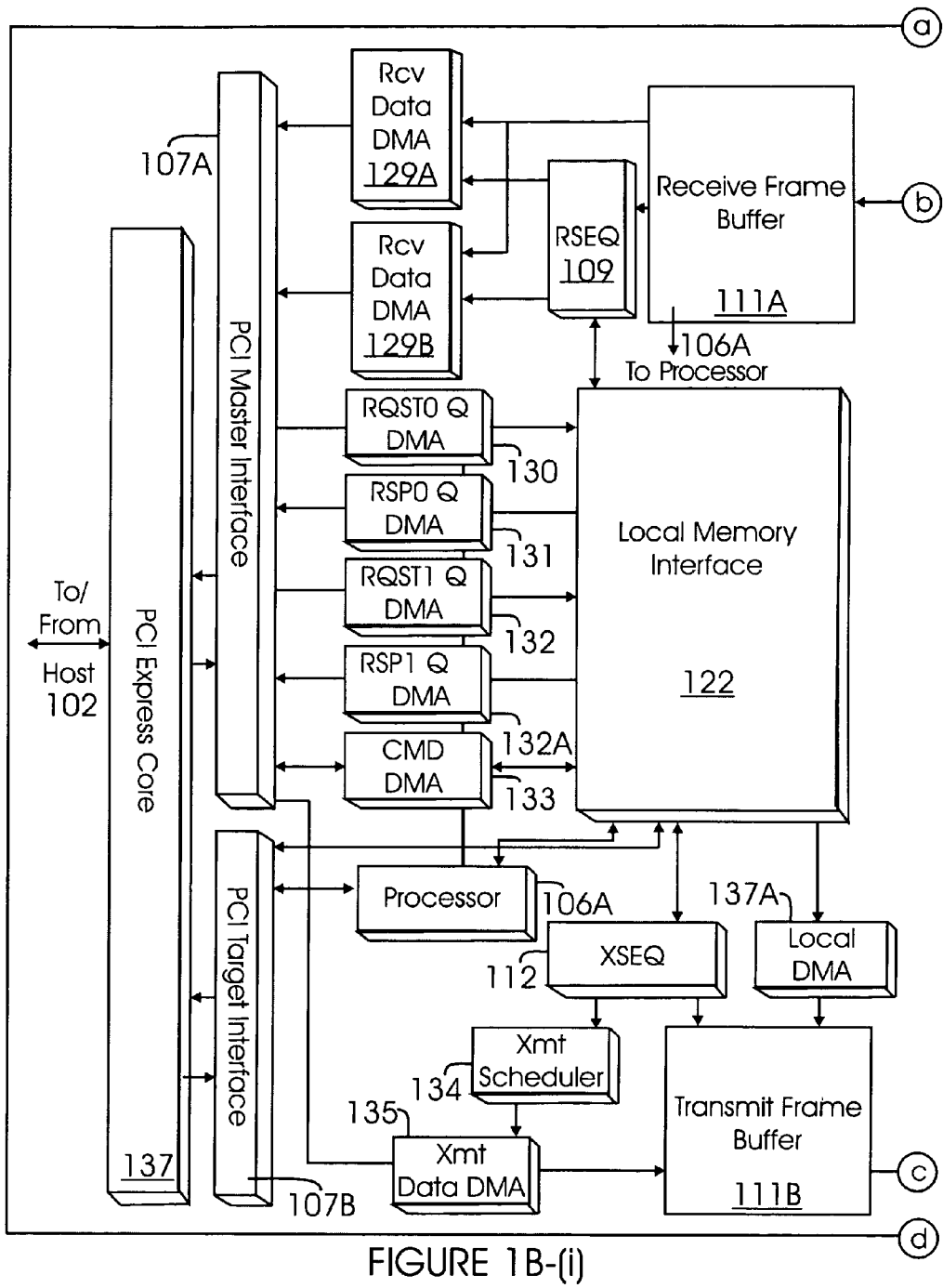
FIGURE 1B-(i)

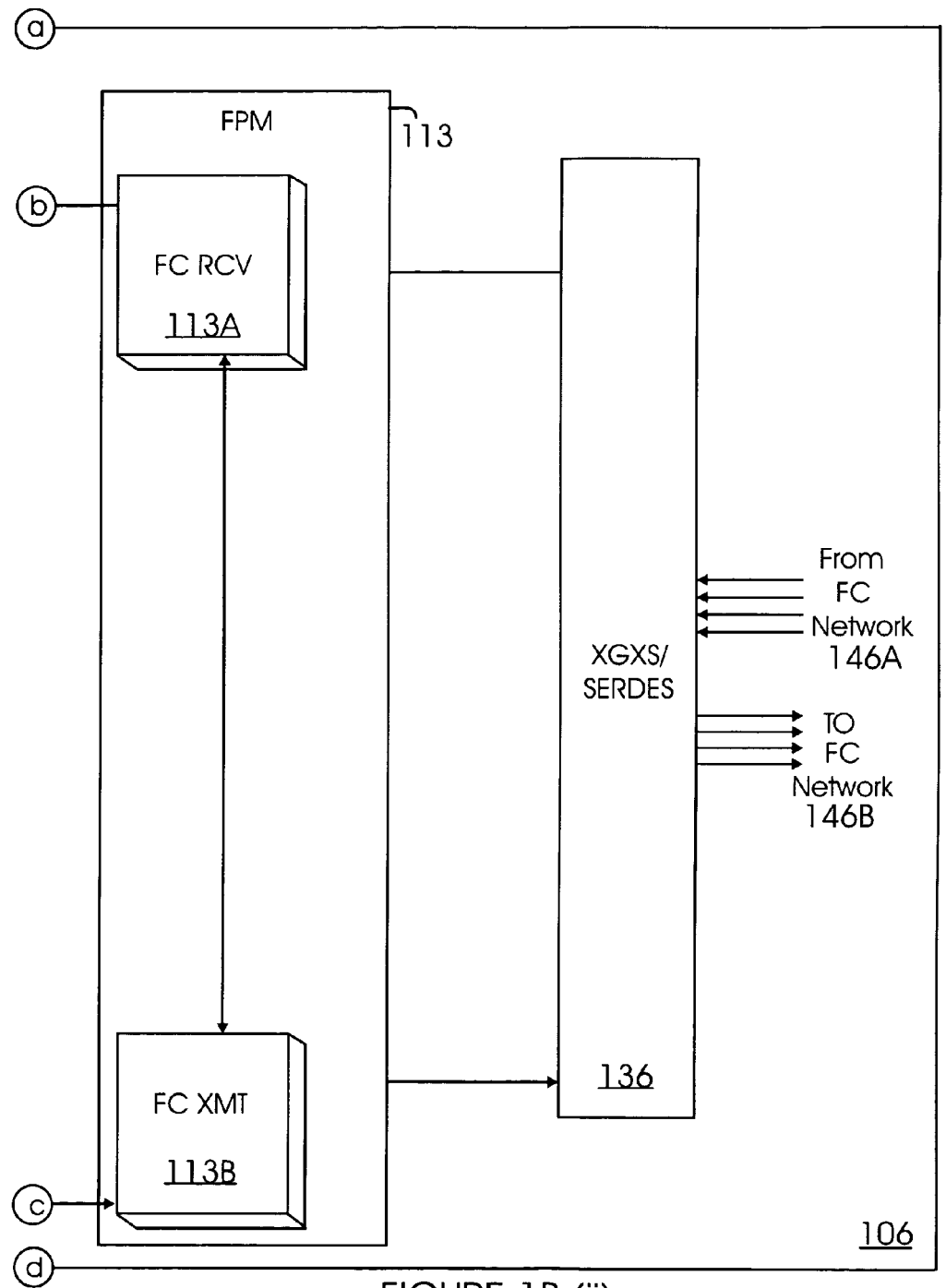
FIGURE 1B-(ii)

METHOD AND SYSTEM FOR DYNAMICALLY ADJUSTING DATA TRANSFER RATES IN PCI-EXPRESS DEVICES

CROSS REFERENCE TO RELATED APPLICATIONS

This patent application is related to the U.S. patent application Ser. No. 11/100,063, filed on Apr. 6, 2005, entitled, "METHOD AND SYSTEM FOR RECEIVER DETECTION IN PCI-EXPRESS DEVICES", the disclosure of which is incorporated herein by reference in its entirety:

BACKGROUND

1. Field of the Invention

The present invention relates to PCI-Express devices and more particularly, to dynamically adjusting data transfer rates for such devices for optimum performance.

2. Background of the Invention

Computing systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with peripheral devices via an interface such as the Peripheral Component Interconnect ("PCI") interface, a local bus standard that uses parallel data transfer, or the extension of PCI known as PCI-X. Both the PCI and PCI-X standard specifications are incorporated herein by reference in their entirety.

More recently, PCI-Express, a standard interface incorporating PCI transaction protocols at the logical level, but using serial data transfer at the physical level has been developed to offer better performance than PCI or PCI-X. PCI-Express is an Input/Output ("I/O") bus standard (incorporated herein by reference in its entirety) that is compatible with existing PCI cards using the PCI Express bus.

Various other standard interfaces are also used to move data between host systems and peripheral devices. Fibre Channel is one such standard. Fibre Channel (incorporated herein by reference in its entirety) is an American National Standard Institute (ANSI) set of standards, which provides a serial transmission protocol for storage and network protocols.

Host systems are used in various network applications, including storage area networks ("SANs"). In SANs, plural memory storage devices are made available to various host computing systems. Data in a SAN is typically moved between plural host systems and storage systems (or storage devices, used interchangeably throughout this specification) through various controllers/adapters, for example, host bus adapters ("HBAs").

HBAs (a PCI-Express device) that are placed in SANs receive serial data streams (bit stream), align the serial data and then convert it into parallel data for processing. HBAs operate as a transmitting device as well as the receiving device.

The PCI-Express Specification provides for two categories of lane operating speeds, Generation 1 (Gen 1) rate of 2.5 Ghz and Generation 2 (Gen 2) rate of 5 Ghz. The Gen 2 rate is provided to meet the high data transfer rate of 500 megabytes per second (5 GB). Up to 32 serial lanes can operate in parallel providing a total system transfer rate of 16 gigabytes per second.

The PCI-Express standard merely provides the option for PCI-Express devices to support Gen 1 or Gen 2 speeds, but fails to provide any guidance, as to how the PCI-Express devices should configure themselves to operate in different environments. For example, a host system depending upon its capability may support 4, 8 or any other number of lanes for a HBA. The HBA may have throughput capability of 2 GB, 4 GB or any other throughput rate. The HBA may support 4 lanes, 8 lanes or any other number of lanes depending on the HBA's throughput capability and the data transfer rate. The PCI-Express specification does not provide any guidance as to how this HBA should configure itself so that it can efficiently operate in different environments, as described in the example above.

Therefore, there is a need for a method and system for PCI-Express devices to dynamically adjust data transfer rates depending on the operating environment and HBA capabilities.

SUMMARY OF THE INVENTION

In one aspect of the present invention, a method for configuring a PCI-Express device is provided. The method includes determining if a number of lanes supported by the PCI-Express device is equal to or greater than a number X, after a receiver is detected by the PCI-Express device; and setting a transfer rate depending on the number X. The value of X depends on the PCI-Express device's throughput capability and a data transfer rate.

In another aspect of the present invention, a PCI-Express Device is provided that includes PCI-Express core logic that receives information from a Physical Coding Sub-layer indicating if a number of lanes supported by the PCI-Express device is equal to or greater than a number X, after a receiver is detected; and a transfer rate is set depending on the number X. The value of X depends on the PCI-Express device's throughput capability and a data transfer rate.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1B (i)-(ii) (jointly referred to as FIG. 1B) shows a block diagram of a HBA, used according to one aspect of the present invention;

DETAILED DESCRIPTION OF THE PREFERRED EMBODIMENTS

In one aspect of the present invention, a method and system is provided for a PCI-Express device to dynamically configure itself based on the operating environment in which the device is placed and the processing capabilities (for example, throughput capabilities) of the device itself.

To facilitate an understanding of the preferred embodiment, the general architecture and operation of a host/HBA/PCI-Express topology will be described. The specific architecture and operation of the preferred embodiment will then be described with reference to the general architecture.

Figure 1A:
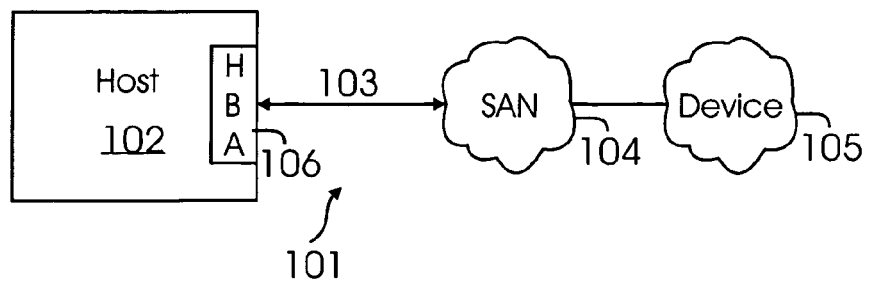
FIG. 1A shows a block diagram of a host system communicating with a device.

Host System/HBA:

FIG. 1A shows a block diagram of a system 101 where a host computing system 102 is coupled to a storage device 105 via a SAN 104. HBA 106 facilitates data transfer between host 102 and device 105. HBA capabilities can be measured by various parameters, for example, data throughput, which is a HBA's ability to process data and is measured in bytes per second. For example, a 2 GB HBA available from QLogic Corporation, the Assignee of the present application can process data at 2 gigabytes per second. A 4 GB HBA can process data at 4 gigabytes per second.

It is noteworthy that the term HBA and PCI-Express device is used interchangeably throughout this specification. The present invention applies to HBAs and other PCI-Express device.

FIG. 1B shows a block diagram of HBA ("Adapter") 106. Adapter 106 includes processors (may also be referred to as "sequencers") "RSEQ" 109 and "XSEQ" 112 for receive and transmit side, respectively for processing data received from storage sub-systems and transmitting data to storage sub-systems. Transmit path in this context means data path from a host memory (not shown) to the storage systems via adapter 106. Receive path means data path from storage subsystem via adapter 106. Buffers 111A and 111B are used to store information in receive and transmit paths, respectively.

Beside dedicated processors on the receive and transmit path, adapter 106 also includes processor 106A, which may be a reduced instruction set computer ("RISC") for performing various functions in adapter 106.

Adapter 106 also includes fibre channel interface (also referred to as fibre channel protocol manager "FPM") 113 that includes modules 113A and 113B in receive and transmit paths, respectively (shown as "FC RCV" and "FC XMT"). Modules 113A and 113B allow data to move to/from storage systems and are described below in detail. Frames 146A are received from a fibre channel network, while frames 146B are transmitted to the fibre channel network.

Adapter 106 is also coupled to external memory (not shown) and local memory interface 122. Memory interface 122 is provided for managing local memory. Local DMA module 137A is used for gaining access to a channel to move data from local memory (not shown).

Adapter 106 also includes a serial/de-serializer (shown as "XGXS/SERDES") 136 for converting data from 10-bit to 8-bit format and vice-versa.

Adapter 106 also includes request queue DMA channel (0) 130, response queue (0) DMA channel 131, response queue (1) 132A, and request queue (1) DMA channel 132 that interface with request queue 103 and response queue 104; and a command DMA channel 133 for managing command information. DMA channels are coupled to an arbiter module (not shown) that receives requests and grants access to a certain channel.

Both receive and transmit paths have DMA modules "RCV DATA DMA" 129A and 129B and "XMT DATA DMA" 135 that are used to gain access to a channel for data transfer in the receive/transmit paths. Transmit path also has a scheduler 134 that is coupled to processor 112 and schedules transmit operations.

PCI master interface 107A and PCI target interface 107B are both coupled to PCI Express Core logic 137 (may also be referred to as "logic 137" or "module 137").

Figure 1C:
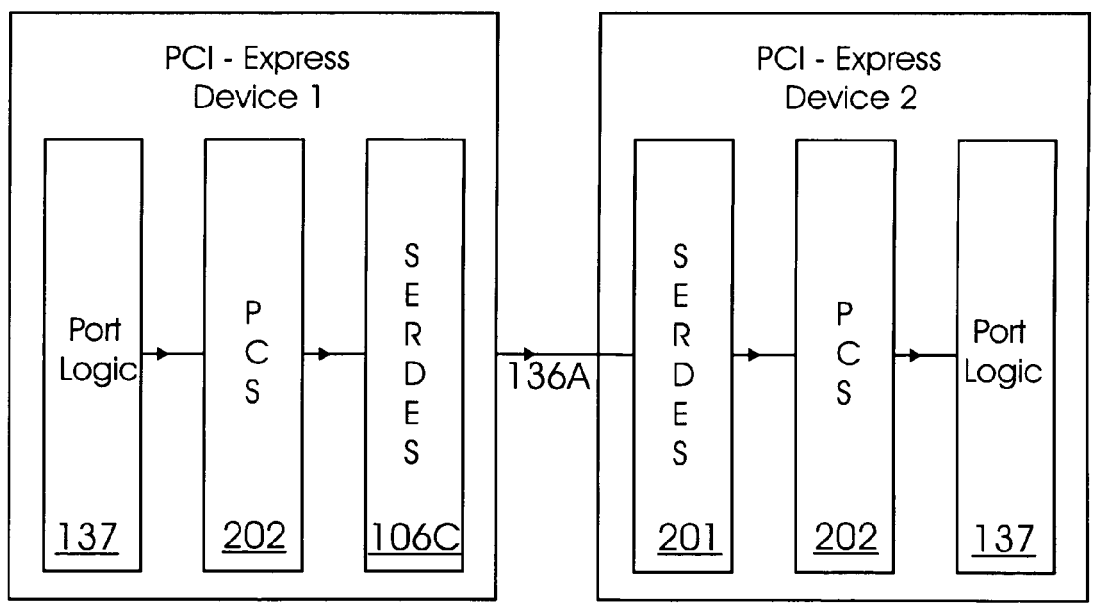
FIG. 1C shows two PCI-Express devices communicating with each other.

PCI-Express Device Configuration:

FIG. 1C shows a PCI-Express device 1 communicating with PCI-Express device 2 using link 136A. In this configuration, SERDES 106C transmits a serial bit-stream to SERDES 201. SERDES 201 then send the bit-stream to Physical Coding Sub-layer ("PCS") 202 that decodes the received data. Port logic 137 in PCI-Express device 2 receives the de-coded data from PCS 202.

PCI-Express uses discrete logical layers to process inbound and outbound information. The layered structure is shown in FIG. 1D. The logical layers are the Transaction Layer 114B, Data Link Layer ("DLL") 114A and a Physical Layer ("PHY") 115A, and a receive side communicates with a transmit side.

PCI-Express uses a packet-based protocol to exchange information between Transaction layers 114B. Transactions are carried out using Requests and Completions. Completions are used only when required, for example, to return read data or to acknowledge completion of an I/O operation.

At the transmit side, packets flow from the Transaction Layer 114B to PHY 115A. On the receive side, packets are processed by the PHY layer 115A and sent to the Transaction layer 114B for processing. DLL 114A serves as an intermediate layer between PHY layer 115A and Transaction layer 114B.

The Transaction Layer 114B assembles and disassembles Transaction Layer Packets ("TLPs"). TLPs are used to communicate transactions, such as read and write and other type of events.

Figure 1E:
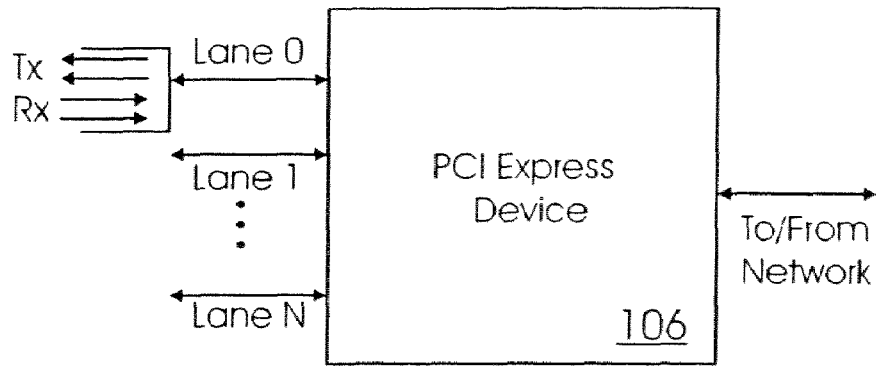
FIG. 1E shows physical lane configuration of a PCI Express device.
Figure 1D:
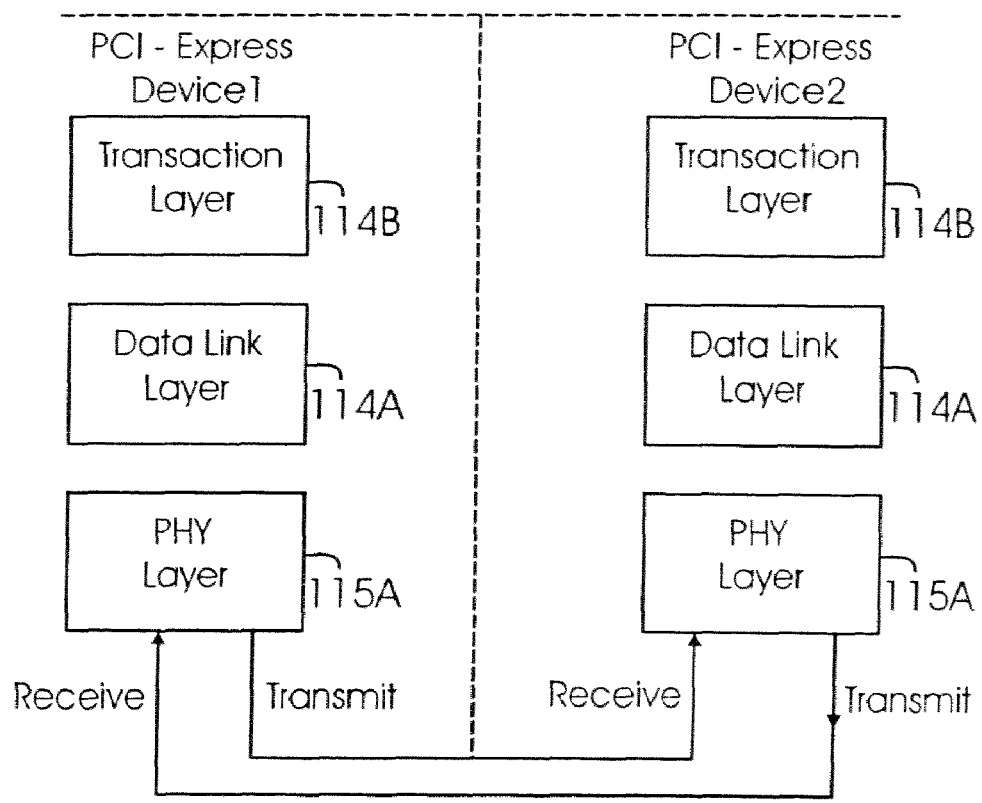
FIG. 1D shows the layered architecture of the PCI-Express standard.

FIG. 1E shows a top-level block diagram of a PCI-Express device and the lane structure for communicating with a host system. Lane 0 to Lane N is shown that interface with a host system. Each lane utilizes 4 wires, two for the receive side (Rx) and two for the transmit side (Tx). Different host systems support different number of lanes.

PCI-Express devices may have different number of lanes and processing capabilities (i.e. data throughput). Both host and devices may have different transmit and receive capabilities. Some may operate at Generation 1 data rates while others may support both Generation 1 and Generation 2 data rates. In one aspect of the present invention, a configuration process is provided so that a PCI-Express device can configure itself to meet the foregoing varying conditions.

Figure 2A:
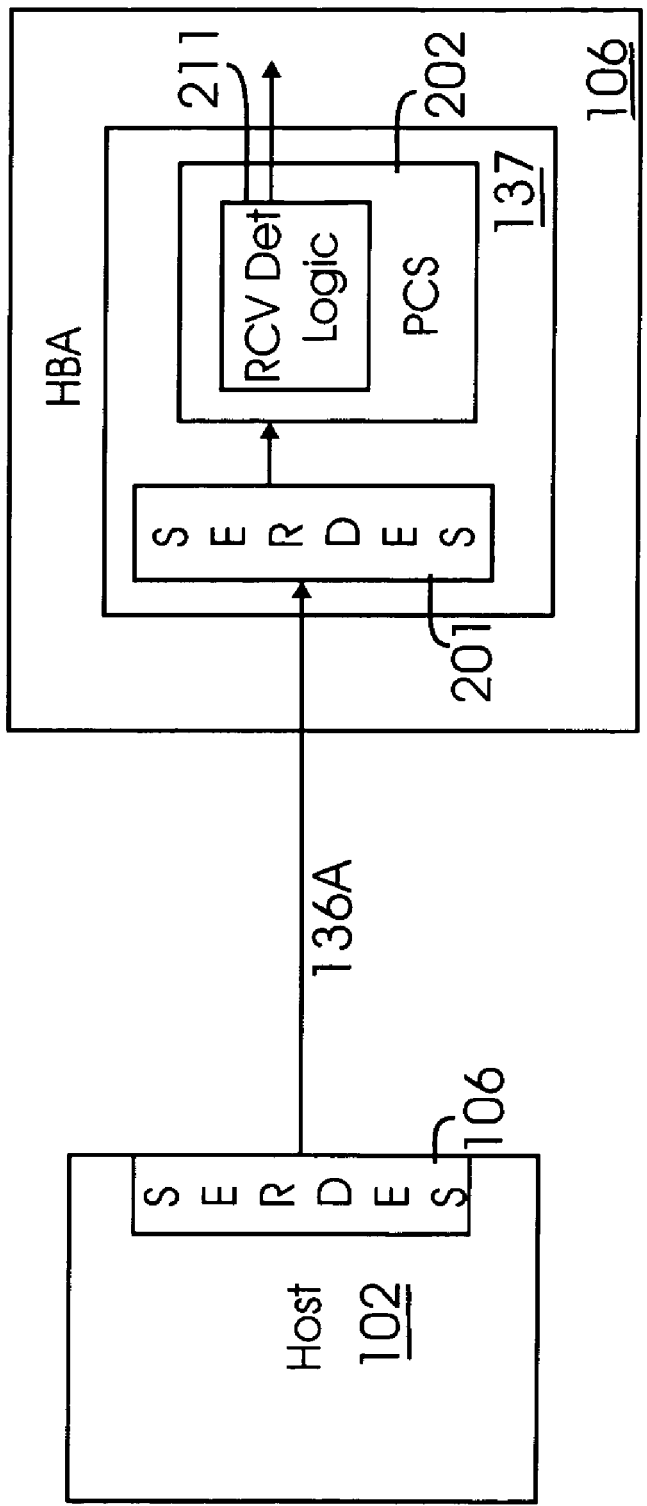
FIG. 2A shows a block diagram of a HBA with a PCS module, used according to one aspect of the present invention.

FIG. 2A shows a system level block diagram with an expanded view to show certain components of logic 137. Logic 137 includes SERDES 201 and PCS module 202. PCS module 202 includes receiver detection logic 211 (may also be referred to as module 211 or logic 211) that detects when a receiver is present. Logic 211 is described in detail in co-pending application Ser. No. 11/100,063, filed on Apr. 6, 2005, entitled "METHOD AND SYSTEM FOR RECEIVER DETECTION IN PCI-EXPRESS DEVICES" incorporated herein by reference in its entirety.

Host 102 sends random serial data via SERDES 106C and link 136A. SERDES 201 receives the incoming data stream and passes the data stream to PCS 202.

Figure 2B:
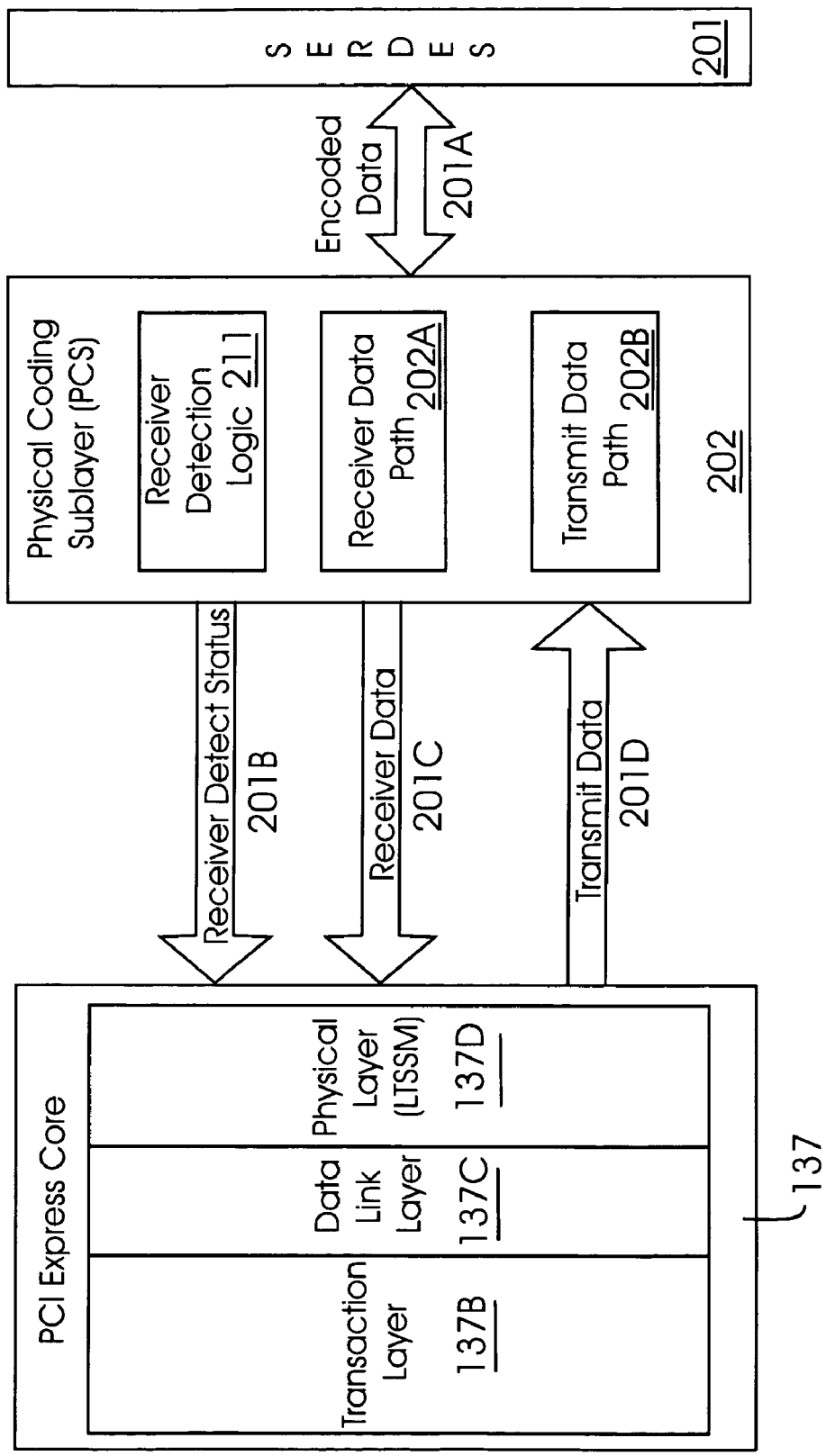
FIG. 2B shows a block diagram of a PCS module interfacing with PCI Express Core Logic, according to one aspect of the present invention.

FIG. 2B shows a top-level block diagram showing the receive data path 202A and transmit data path 202B in a PCI-Express device. A receiver is detected by logic 211, as described in detail in the aforementioned patent application and a status 201B is sent to PCI Express Core 137. PCI Express Core 137 includes logic for a transaction layer 137B, Data link layer 137C and a physical layer 137D (similar to layers 114B, 114A and 115A, respectively, as shown in FIG. 1D).

SERDES 201 sends encoded data to PCS 202. The received data 201C via data path 202A is sent to PCI Express Core 137. The Transaction Layer 137B or the Data Link Layer 137C send data to the Physical Layer 137D which partitions the information into the number of lanes indicated by receiver detection logic 211. Transmit Data 201D is then sent to the Transmit Data Path (202B) of PCS 202 and then to SERDES 201.

Figure 3:
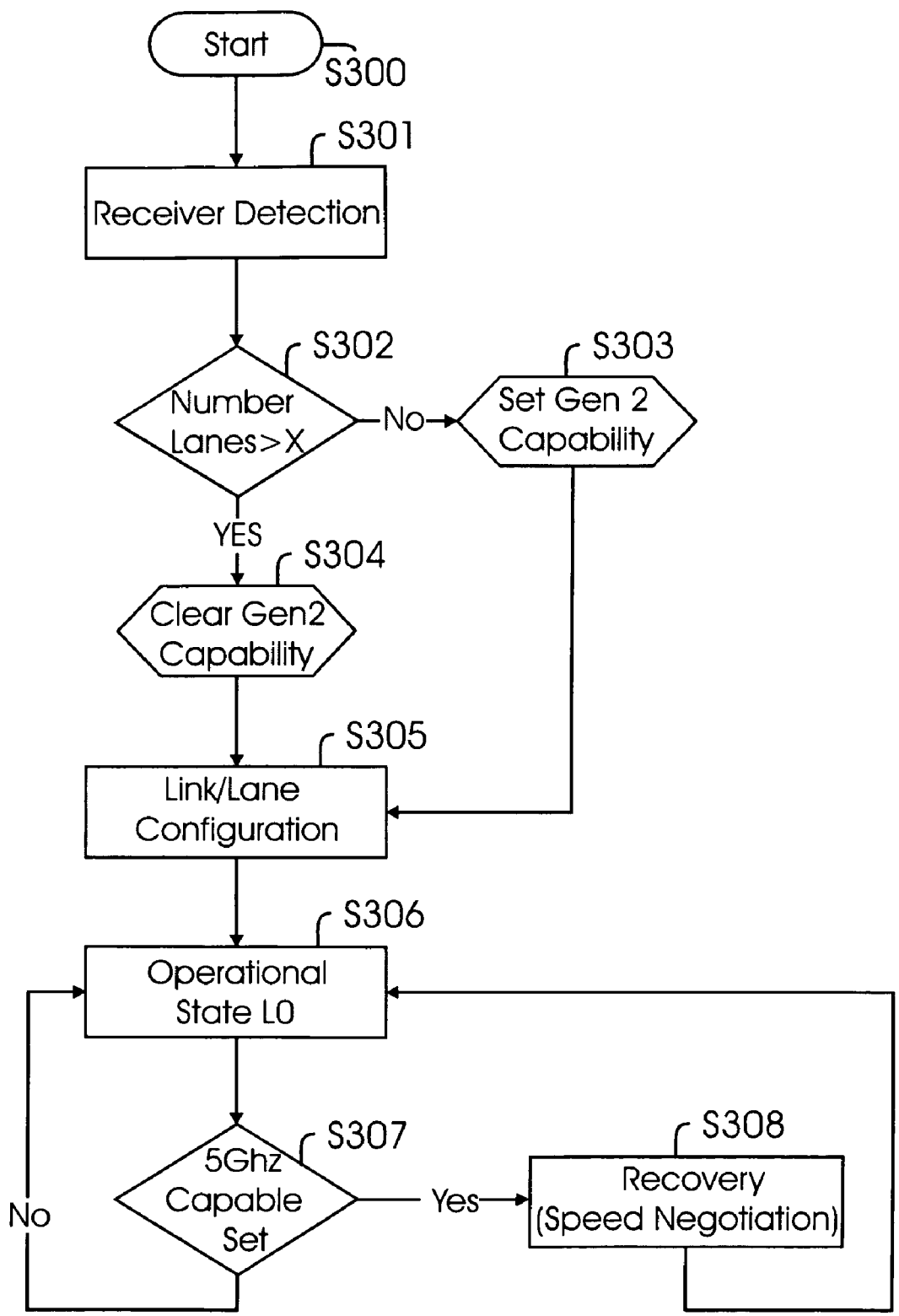
FIG. 3 is a flow diagram of process steps for configuring PCI-Express devices, according to one aspect of the present invention.

Process Flow: FIG. 3 shows a process flow diagram for a PCI-Express device to configure itself for optimum performance. The process begins in step S300, when the PCI-Express device is powered up. In one aspect, the device is a card that is plugged into a PCI-Express slot of a host system.

In step S301, a receiver is detected by logic 211. During this process, logic 211 determines the number of lanes that are connected. Status information 201B is sent to PCS Express Core 137.

In step S302, the device detects if the number of lanes is greater or less than a certain number X. X represents a certain number or maximum number of lanes that are supported by the HBA and depends on a HBA's throughput rate and the data transfer rate.

As discussed above, each PCI-Express device has a throughput capability, for example, 2 GB, 4 GB and so forth. The number of lanes supported by a PCI-Express device can be determined by dividing the throughput capability by the data transfer rate. For example, a 2 GB HBA at a data transfer rate of 500 megabytes per second is able to support only 4 lanes. The number of lanes is a function of HBA throughput capability and data transfer rate and is represented by X.

One reason for this process step is that some PCI-Express devices can support 4 physical lanes at Gen 1 or Gen 2 speeds, and 8 lanes at Gen 1 speed. The number X will vary depending on the type of device and it's processing capabilities. For example, a 1 GB HBA provided by QLogic® Corporation, the assignee of the present invention, can support 4 physical lanes at 2.5 Ghz, while a 2 GB HBA can support 4 physical lanes at 5 GHz and 8 lanes at 2.5 GHz.

If the number of physical lanes is less than X, then in step S303, Gen 2 capability is set and the process moves to step S305. If the number of lanes is greater than X, then in step S304, the Gen 2 capability is cleared and the process moves to step S305.

In step S305, a process state machine in physical layer 137D as outlined by the PCI Express Specification, performs the lane/link configuration. The state machine performs this step based on the lane connection information received from PCS 202. The state machine determines if speed negotiation is possible and to properly indicate lane speed capability using the information received from PCS 202.

A training sequence is initiated during this step to broadcast training packets TS1 and TS2. The TS1 and TS2 packet format is established by the PCI-Express specification. The state machine sets the TS1 and TS2 values based on the number of detected lanes. For example, if the number of lanes is greater than 4, then TS1 and TS2 Symbol 4 bit 1 is set that indicates a 2.5 Ghz capability. If the number of lanes is equal to or less than 4, then TS1/TS2 Symbol bit 2 is set to indicate 5 GHz capability.

In step S306, the process enters operational state L0, as defined in the PCI Express Specification, at which time packet information is shared between the HBA (106) and the host system (102). In step S307, the state machine determines if the 5 Ghz capability is set (step S303). If yes, then in step S308, speed negotiation occurs. During speed negotiation, HBA 106 and Host system 102 re-enter and Idle state for a short duration. During this duration, TS1/TS2 ordered sets as outlined by the PCI Express Specification are re-transmitted. Specially identified field within these data packets indicate a speed change request and the data rates (Gen 1 or Gen 2) at which the device is able to operate. Each device then determines the highest possible data rate supported and initiates a change in data rate based upon this information.

If the 5 GHz capability is not set, then the process loops back to step S306 and no speed change request is initiated.

In one aspect of the present invention, the operational speeds for a link are set based on the capability of a PCI-Express device and the number of available lanes. The process dynamically adjusts the transfer rates based on the number of lanes to achieve optimum performance.

Although the present invention has been described with reference to specific embodiments, these embodiments are illustrative only and not limiting. Many other applications and embodiments of the present invention will be apparent in light of this disclosure and the following claims.

What is claimed is:

1. A method for configuring an adapter operationally coupled to a host system, comprising:

determining if a number of lanes supported by the adapter is greater than a number X, after a receiver is detected by the adapter; wherein X depends on a throughput capability of the adapter and a data transfer rate; and setting a first lane operating speed if the number of lanes is less than the number X and setting a second lane operating speed if the number of lanes is greater than the number X.

2. The method of claim 1 wherein the number X is determined by dividing the throughput capability by the data transfer rate.

3. The method of claim 1, wherein a state machine in a physical layer of a core logic performs lane configuration after receiving information regarding the number of lanes supported by the adapter.

4. The method of claim 3, wherein the state machine, based on the number of lanes supported by the adapter, sets certain bit values of a first training packet and a second training packet to broadcast link operating speeds.

5. The method of claim 4, wherein if X is equal to or less than 4, then an operating speed of 5 Ghz is set and during a speed negotiation step, the adapter and another device enter an idle state for a duration during which the first training packet and the second training packet are re-transmitted and both the adapter and the other device initiate a change in operating speed based on information embedded in the re-transmitted first training packet and the second training packet.

6. The method of claim 1 wherein if X is greater than 4, then an operating speed of 2.5 GHz is set.

7. The method of claim 1, wherein the adapter is a host bus adapter.

8. An adapter operationally coupled to a host system, comprising:
    a core logic that receives information from a Physical Coding Sub-layer indicating if a number of lanes supported by the adapter is greater than a number X, after a receiver is detected; wherein X depends on a throughput capability of the adapter and a data transfer rate; and a first lane operating speed is set if the number of lanes is less than the number X and a second lane operating speed is set if the number of lanes is greater than the number X.

9. The adapter of claim 8, wherein the number X is determined by dividing the throughput capability by the data transfer rate.

10. The adapter of claim 8, wherein a state machine in a physical layer of the core logic performs lane configuration after receiving information regarding the number of lanes supported by the adapter.

11. The adapter of claim 10, wherein the state machine, based on the number of lanes supported by the adapter, sets certain bit values of a first training packet and a second training packet to broadcast link operating speeds.

12. The adapter of claim 11, wherein if X is equal to or less than 4, then an operating speed of 5 Ghz is set and during a speed negotiation step, the adapter and another device enter an idle state for a duration during which the first training packet and the second training packet are re-transmitted and both the adapter and the other device initiate a change in operating speed based on information embedded in the re-transmitted first training packet and the second training packet.

13. The adapter of claim 8, wherein if X is greater than 4, then an operating speed of 2.5 GHz is set.

14. The adapter of claim 8, wherein the adapter is a host bus adapter.

15. The adapter of claim 14, wherein the host bus adapter is operationally coupled to a computing system for transferring data to and from a storage area network.

16. The adapter of claim 8, wherein the PCI-Express device is operationally coupled to another PCI-Express device for transferring data.

* * * * *

UNITED STATES PATENT AND TRADEMARK OFFICE
CERTIFICATE OF CORRECTION

PATENT NO. : 7,461,195 B1  Page 1 of 1
APPLICATION NO. : 11/378838
DATED : December 2, 2008
INVENTOR(S) : David E Woodral It is certified that error appears in the above-identified patent and that said Letters Patent is hereby corrected as shown below:

In column 6, line 51, in Claim 2, delete "1" and insert -- 1, --, therefor.

In column 7, line 4, in Claim 6, delete "1" and insert -- 1, --, therefor.

Signed and Sealed this

Eleventh Day of May, 2010

David J. Kappos
*Director of the United States Patent and Trademark Office*